No. 829,157. PATENTED AUG. 21, 1906.
F. A. JOHNSON.
TYPE DISTRIBUTING MACHINE.
APPLICATION FILED AUG. 3, 1900.
9 SHEETS—SHEET 4.
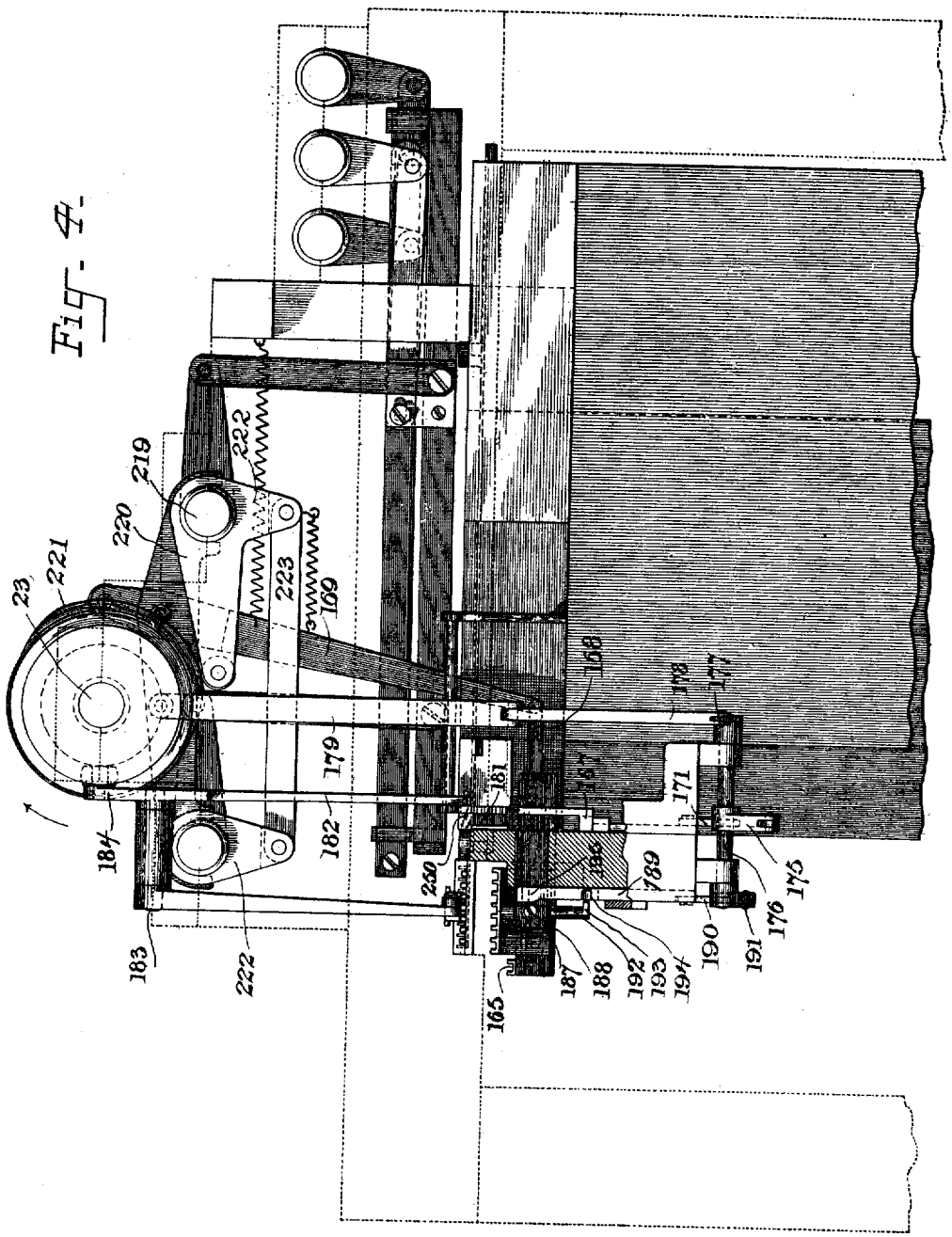
Witnesses.
John F. Nelson.
C. W. Clements
Inventor.
Frank Amos Johnson,
By Watson, Atty.

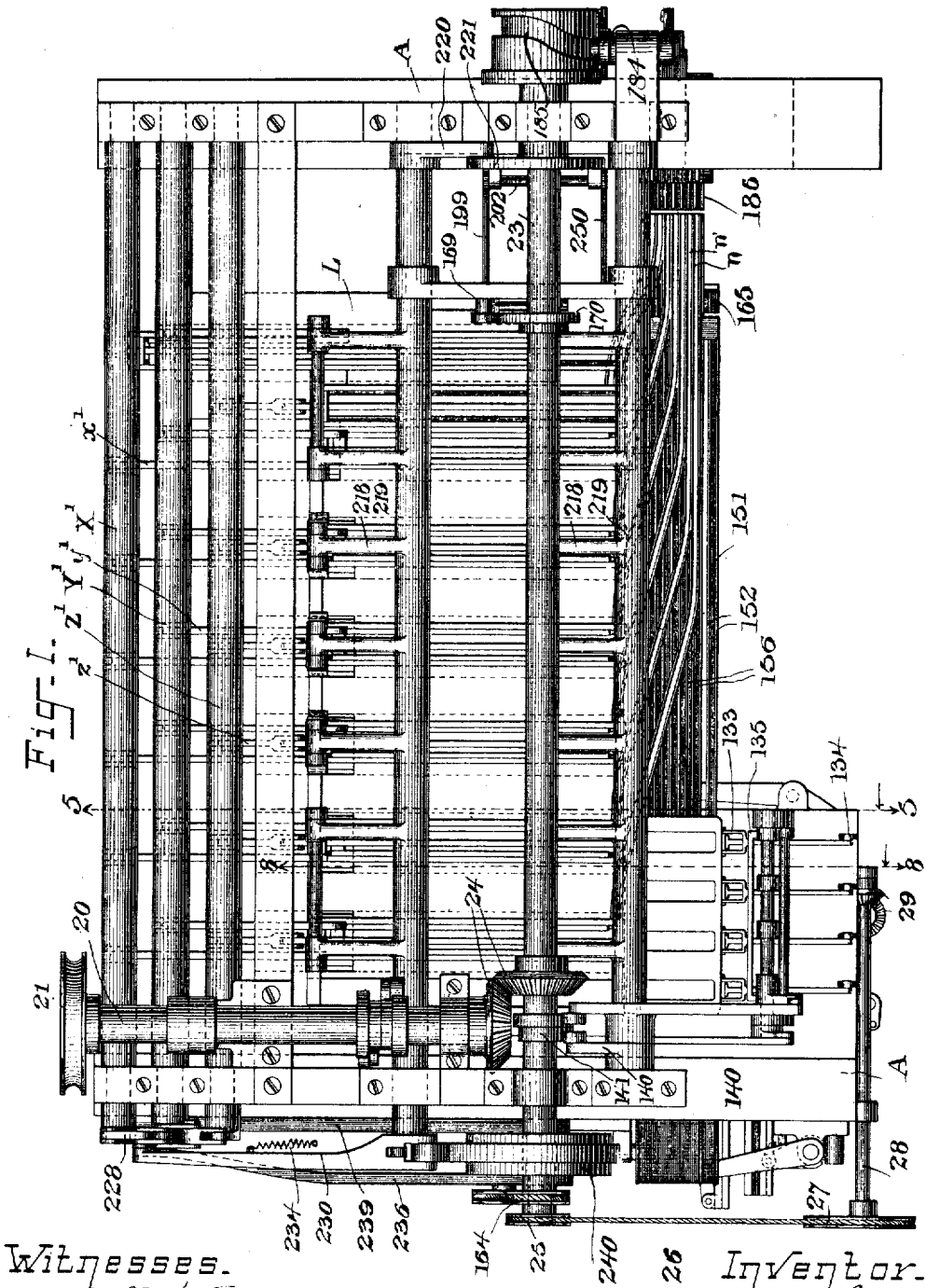

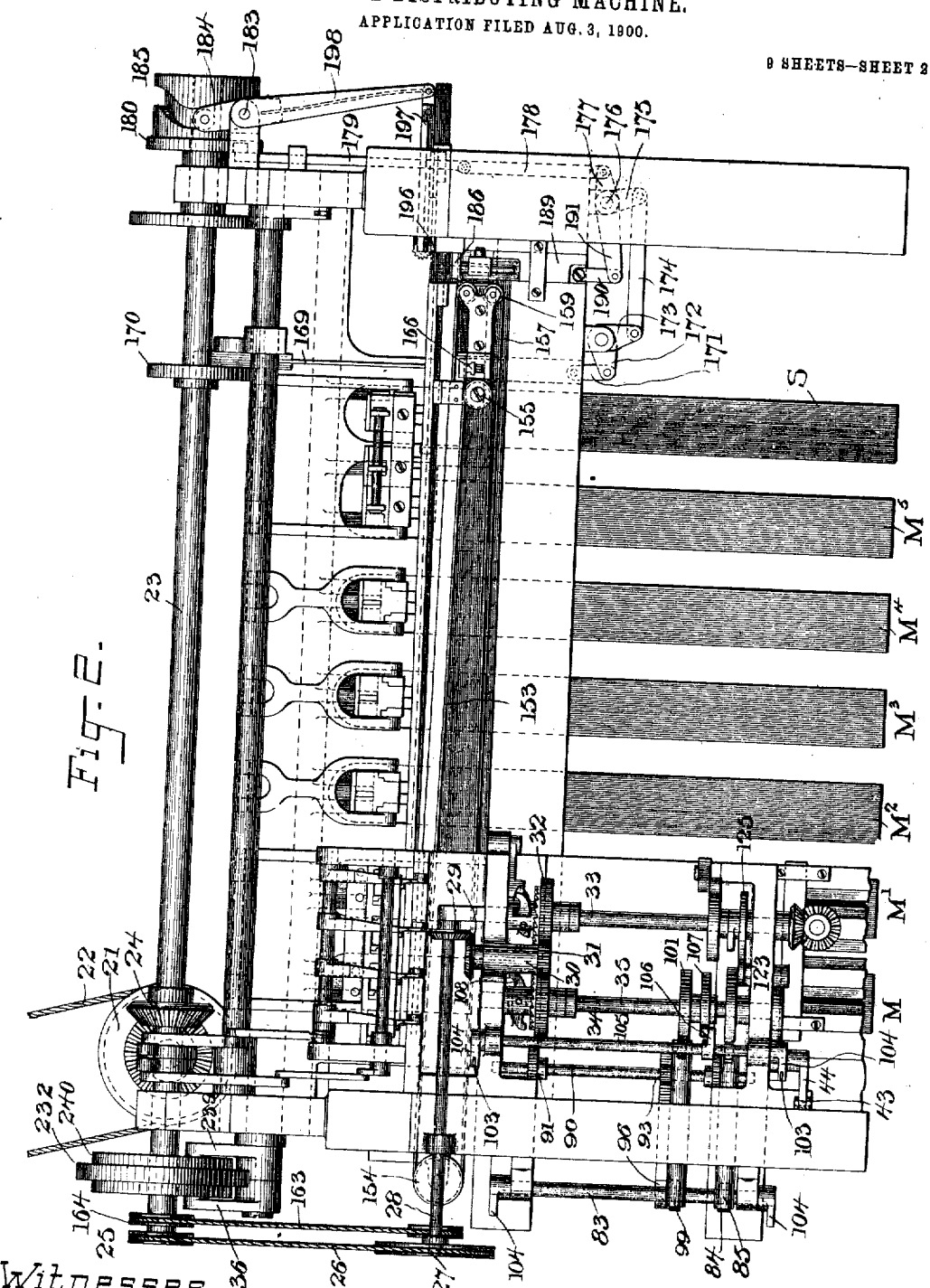

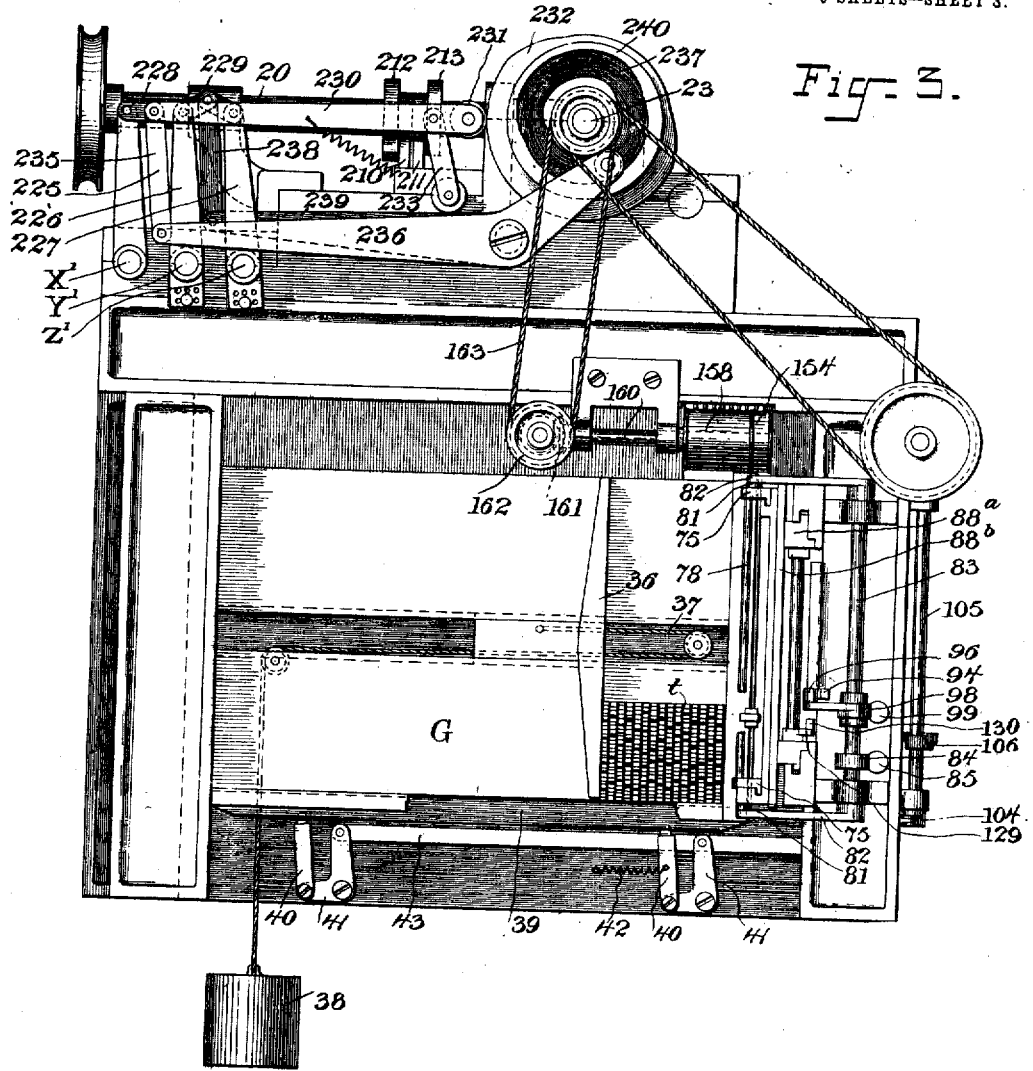

No. 829,157. PATENTED AUG. 21, 1906.
F. A. JOHNSON.
TYPE DISTRIBUTING MACHINE.
APPLICATION FILED AUG. 3, 1900.
9 SHEETS—SHEET 5.
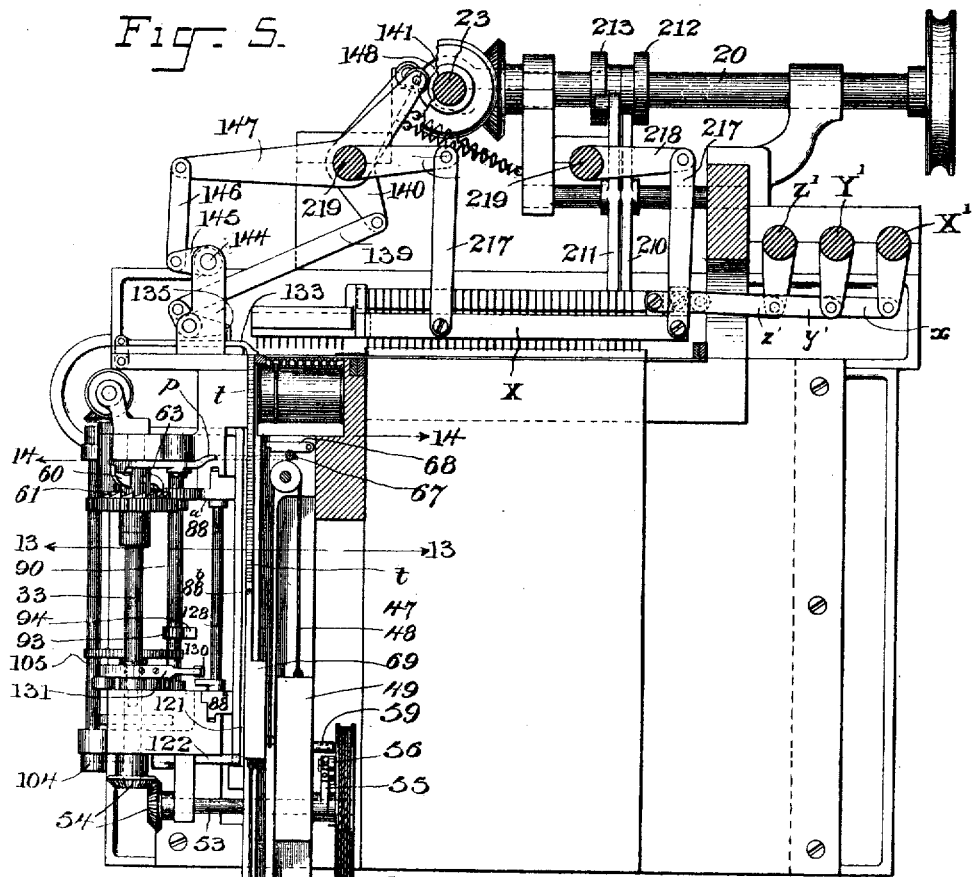
Witnesses.
John F. Nelson.
C. W. Clement.
Inventor.
Frank Amos Johnson
By J. H. Watson, atty.

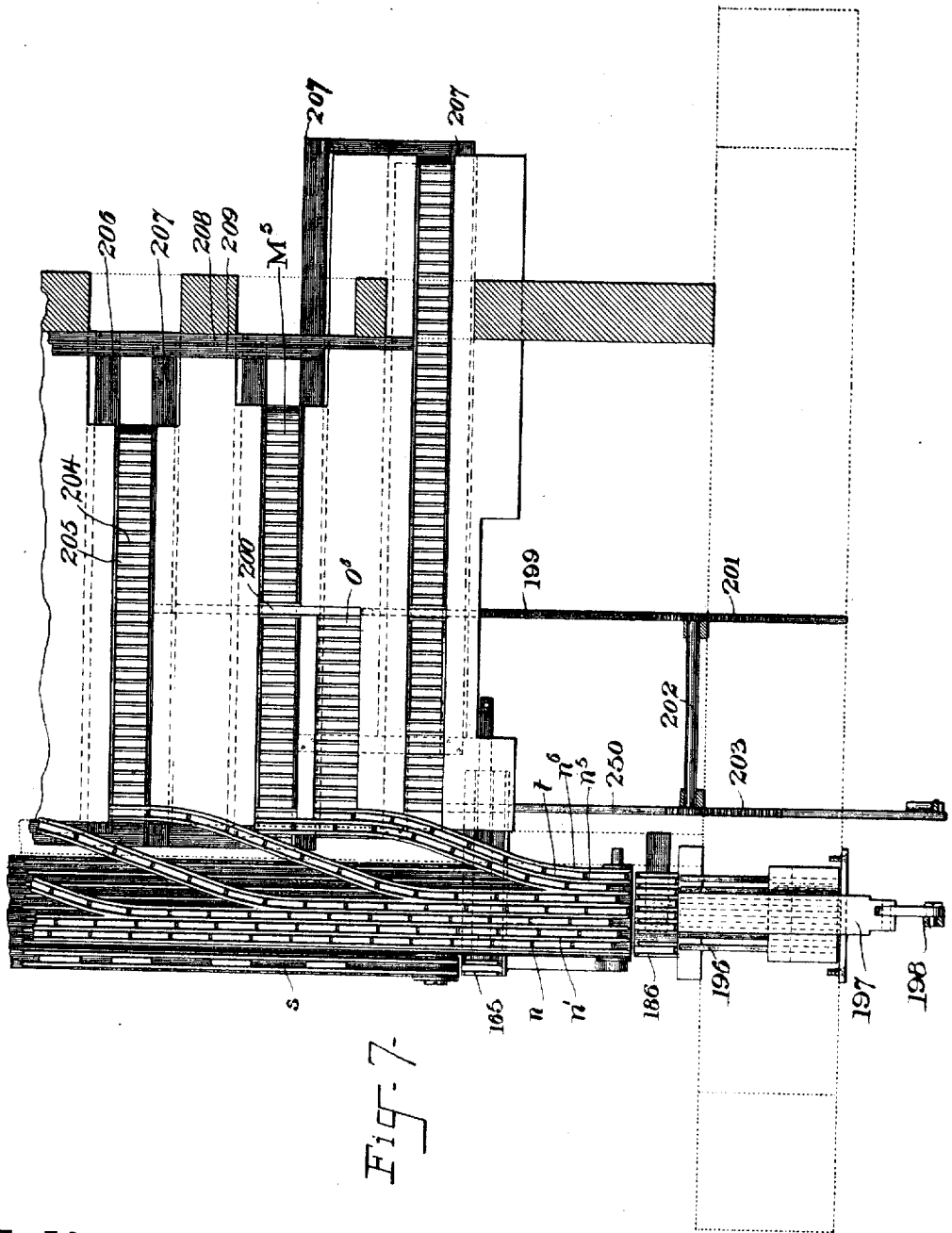

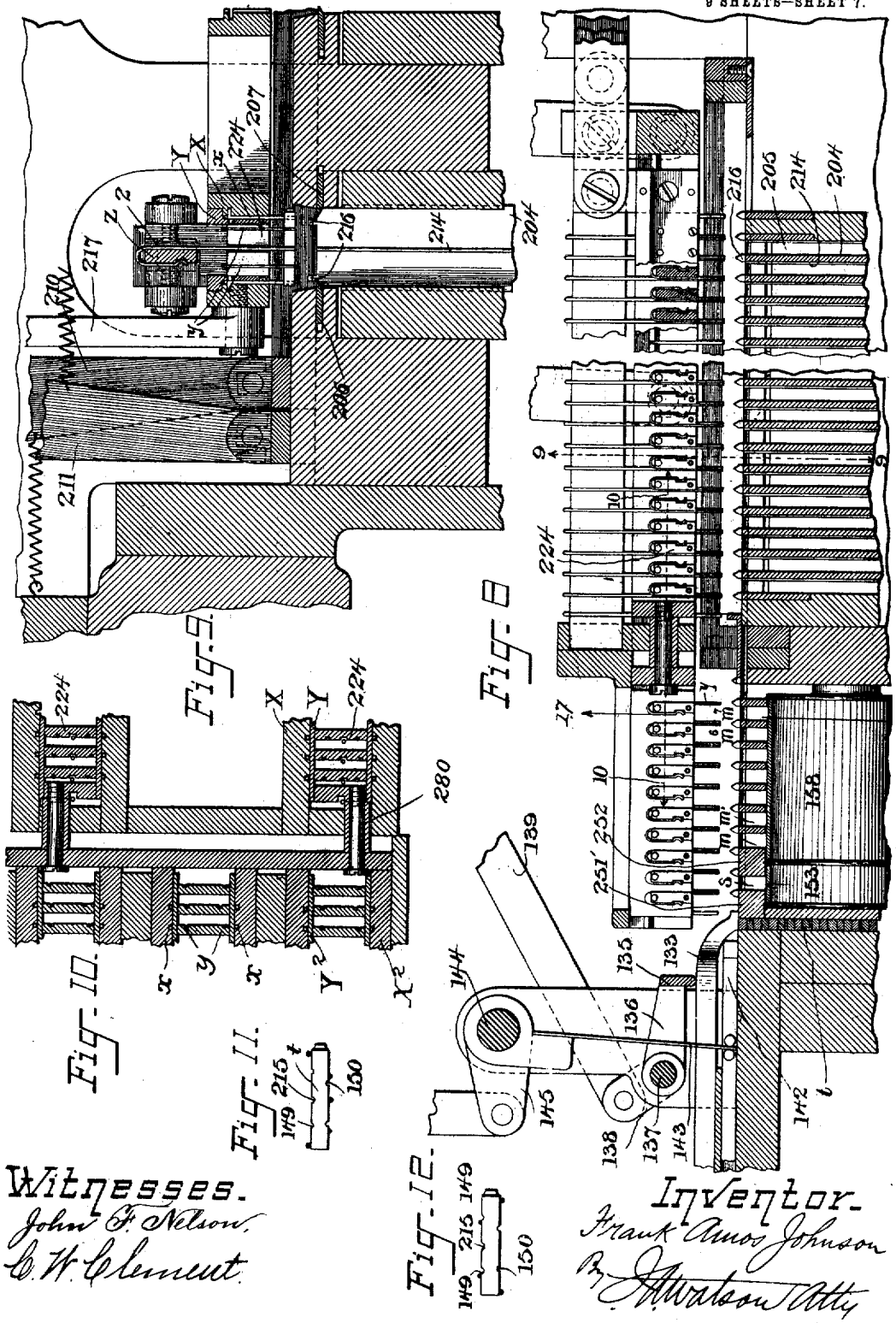

No. 829,157. PATENTED AUG. 21, 1906.
F. A. JOHNSON.
TYPE DISTRIBUTING MACHINE.
APPLICATION FILED AUG. 3, 1900.
9 SHEETS—SHEET 8.
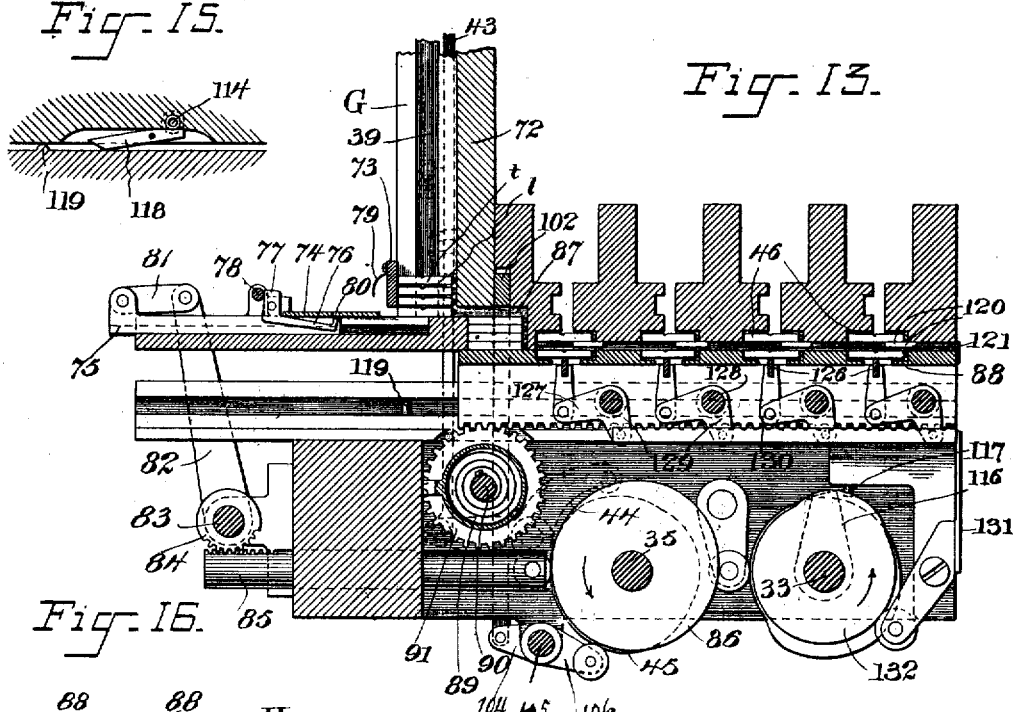
Witnesses
John F. Nelson
C. W. Clement
Inventor
Frank Amos Johnson
by J. H. Watson atty No. 829,157. PATENTED AUG. 21, 1906.
F. A. JOHNSON.
TYPE DISTRIBUTING MACHINE.
APPLICATION FILED AUG. 3, 1900.
9 SHEETS—SHEET 9.
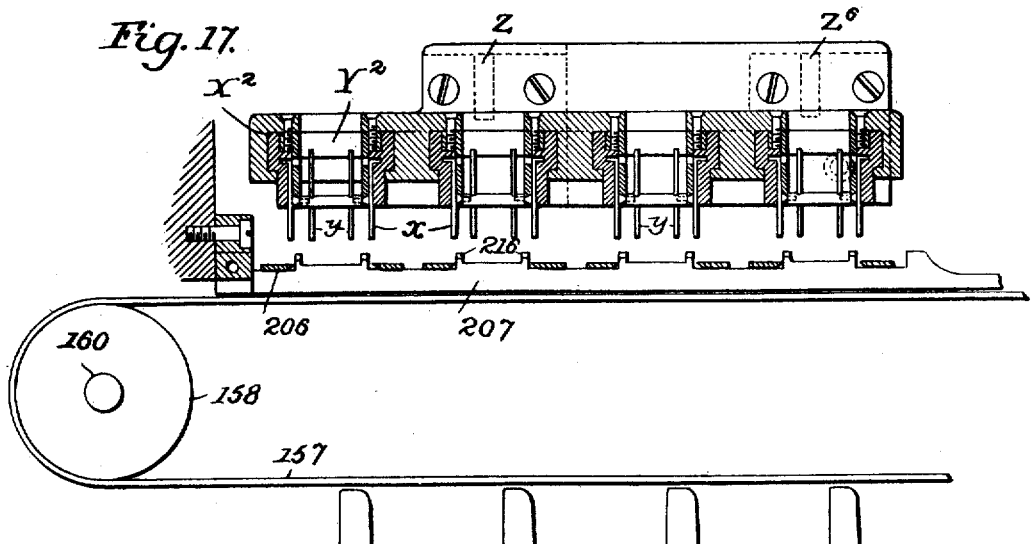
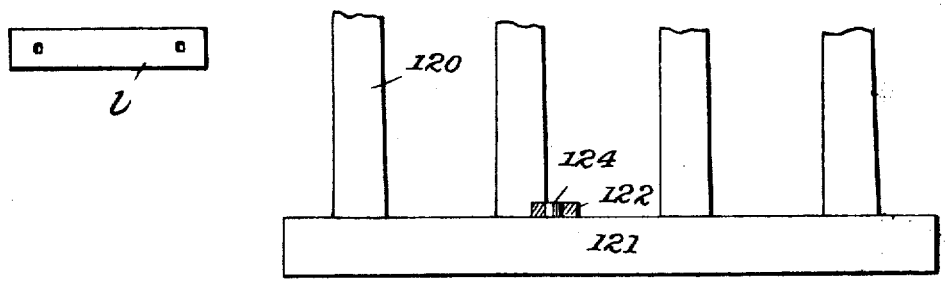
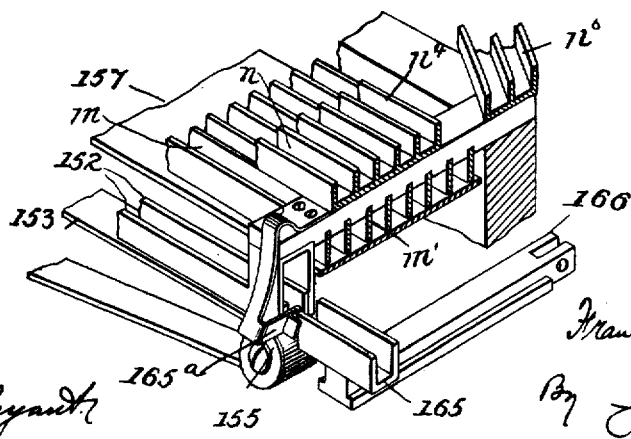

UNITED STATES PATENT OFFICE.

FRANK AMOS JOHNSON, OF NEW BEDFORD, MASSACHUSETTS, ASSIGNOR, BY MESNE ASSIGNMENTS, TO THE UNITYPE COMPANY, OF MANCHESTER, CONNECTICUT, A CORPORATION OF NEW JERSEY.

TYPE-DISTRIBUTING MACHINE.

No. 829,157.   Specification of Letters Patent.   Patented Aug. 21, 1906.

Application filed August 3, 1900. Serial No. 25,795.

*To all whom it may concern:*

Be it known that I, FRANK AMOS JOHNSON, a citizen of the United States, residing at New Bedford, in the county of Bristol and State of Massachusetts, have invented certain new and useful Improvements in Type-Distributing Machines, of which the following is a specification.

This invention consists in a machine adapted to distribute ordinary printers' type, the type being supplied to a galley in column form and separated successively into lines and individual type.

One object of the invention is to provide a machine of this class which shall have large capacity while running at a speed sufficiently moderate to insure accurate work and a minimum amount of wear and tear. In accomplishing this object I arrange to distribute a plurality of lines at one time and to distribute the type into a plurality of magazines. The types are first separated into fonts or groups equal in number to the magazines, the type of each group being forwarded from the primary separating devices to their magazine. The type are then distributed individually into their proper magazine-channels.

In the operation of the machine the primary distribution is carried on continuously with the exception of the brief periods required for the supply of new lines in place of exhausted lines. The operation of the secondary distributing devices is entirely continuous.

This improved distributing-machine may be adapted readily to any kind of matter. Thus if there is a preponderance of any one font of type or of any characters they may be distributed into two or more magazines by properly adjusting the combinations of pick-up devices. As shown in the accompanying drawings, the lower-case type are supplied to their magazine at two points, and two lower-case type are distributed each time one upper-case type is distributed.

I shall now proceed to describe the invention in detail, reference being had to the accompanying drawings, in which—

Figure 1 is a plan view of a machine embodying the invention. Fig. 2 is a front elevation. Fig. 3 is a left end elevation. Fig. 4 is a right end elevation with parts of the frame removed. Fig. 5 is a section about on the line 5 5, Fig. 1, looking to the left. Fig. 6 is a detail of the winding-drum. Fig. 7 is a partial plan view of the magazines and other parts below the pick-up devices. Fig. 8 is a sectional view taken about on the line 8 8 of Fig. 1. Fig. 9 is a section on the line 9 9 of Fig. 8. Fig. 10 is a section about on the line 10 10 of Fig. 8. Figs. 11 and 12 are views of type, illustrating the manner of picking them up. Fig. 13 is a section on the line 13 13 of Fig. 5. Fig. 14 is a section about on the line 14 14 of Fig. 5. Figs. 15 and 16 are details. Fig. 17 is a section on line 17, Fig. 8. Fig. 18 is a detail of space-elevator, &c., in perspective; and Fig. 19 shows one of the leads.

The various moving parts of the machine are mounted on a fixed frame A, which may be of any suitable form. On the upper part of the frame is a power-shaft 20, which is constantly driven by a pulley 21 and belt 22. A second constantly-running shaft 23 is geared to the shaft 20 by bevel-gears 24. On the end of the shaft 23 is a pulley 25, which through band 26 and pulley 27 constantly drives a shaft 28, which is connected by bevel-gears 29 to the short vertical shaft 30, having on its lower end a pinion 31, which constantly drives a clutch member 32, running freely on a movement-shaft 33, and a second clutch member 34, running freely on a movement-shaft 35. The type to be distributed are placed in a galley G and urged forward by means of a pusher 36, to which is connected a cord 37 and weight 38, Figs. 3, 13, and 14. If the column of type were permitted to rest upon a fixed base, the moving weight 38 would have to be very heavy to shift a full column of type, and it would act too strongly upon the last few lines of the column. To obviate this difficulty, a bar 39 is supported beneath the column upon legs 40, which are pivotally supported upon elbow-levers 41. The bar 39 stands under the middle portion of the type, and it is normally drawn to the rear by means of a spring 42. When the bar 43, connecting the elbow-levers, is moved forward, bar 39 is raised, thus slightly raising the column of type off of the fixed side of the galley. The type being now supported on the pivoted legs 40 are very easily moved forward by the weight 38. After they are moved forward the required distance—that is, the thickness of one line—the bar 43 is moved to the rear and the type again permitted to rest upon the fixed side of the galley. The rod 43 is connected to an elbow-lever 44, which is rocked by a cam 45 on the movement-shaft 35. (See Figs. 2 and 13.)

In order to construct a machine which shall have a large capacity when operated at a moderate rate of speed, I have arranged the present machine to distribute type from a plurality of different lines simultaneously, in the present instance four lines being distributed at the same time. Referring to Figs. 5, 6, 13, and 14, 46 indicates four fixed vertical channels in which lines of types t are supported by feed-slides 47, which are sustained by cords 48 and weights 49. To the lower ends of the slides 47 are connected cords 50, which pass around pulleys 51 and are connected to a drum 52, which drum is operated periodically to draw down the lifting-slides and raise the weights 49 preparatory to introducing new lines of type into the channels 46. The drum 52 is loosely mounted on a transverse shaft 53, which is connected by bevel-gears 54 to movement-shaft 33. This shaft is periodically connected to the rotating clutch member 32 and disconnected after making a single revolution in a manner to be presently described. Shaft 53 has a fixed arm 55, upon which is mounted a pawl 56. Pawl 56 is normally held in position to engage a lug 57 on the drum 52 by means of a spring 58. As the shaft 53 rotates pawl 56 engages the lug 57 and carries the drum 52 around a sufficient amount to draw the slides 47 down into position to receive new lines. At the proper moment the new lines are transferred to the channels 46, and the drum 52 is released from shaft 53 by reason of the pawl 56 striking a fixed pin 59, which disengages it from the lug 57, Figs. 5 and 6.

The clutch member 32 is engaged with the movement-shaft 33 as follows: In the upper part of said shaft is a pawl 60, which normally tends under spring-pressure to engage with a series of teeth 61 upon the upper side of the clutch member 32, said pawl being held out of engagement by the beveled or cam-shaped end 62 of the arm 63 of an elbow-lever b, pivoted at 64, Figs. 5 and 14. To a second arm 65 of said lever is connected a spring 66, which normally tends to draw the arm 63 away from the pawl 60. The arm 63 is held in engagement with the pawl 60 while any type remain in any of the channels 46 by means of a rod 67, Figs. 2 and 5. This rod is held by four latch-pieces 68, one for each of the type-channels 46, said latch-pieces engaging notches in the rod. As the last type is discharged from each channel 46 a shoulder 69 on the slide 47 for said channel lifts the latch 68 and releases the rod 67. When all four channels are empty, the rod is completely released and the spring 66 throws it to the left, thus releasing clutch-pawl 60, which is moved into engagement with the crown ratchet-wheel 61. The movement-shaft 33 is thereupon carried around for one complete revolution, at the end of which a cam or arm 70 engages an arm 71 of lever b and rocks said lever, bringing the rod 67 back into position to be latched by the latches 68. During this rotation of the shaft 33 the channels 46 are filled with new lines of type and the weighted slides 47 are drawn down and released under said lines.

The mechanism for conveying lines of type from the channel to the galley 46 will now be described. Referring to Figs. 3, 13, and 14, it will be seen that the type in the forward end of the galley are arranged between walls 72 and 73. The forward line of type in the channel is ejected to the right by a plunger 74, carried by slides 75. Pivoted to the slides is a hook 76, which has a vertical arm 77, adapted to engage with a fixed rod 78 when the plunger is in its rearmost position and with a spring-abutment 79 when the plunger is in its foremost position. The fixed rod or abutment 78 throws the hook down below the plunger, while the spring-abutment throws it up. The hook has two prongs which pass through openings 80 in the plunger and engage with corresponding openings in the leads l, if there are any leads in the line. During each rearward movement of the plunger a lead is drawn out of the line to the rear and discharged from the plunger in any suitable manner. The plunger 74 is reciprocated by means of links 81, arms 82, rock-shaft 83, pinion 84, rack 85, and cam 86 on the movement-shaft 35. For each revolution of said shaft a line is ejected from the galley into a receptacle or box 87, which, as shown, is capable of holding five lines of type. From the receptacle 87 the lines of type are fed into channels 88 in a movable line-holder H, said line-holder having four channels adapted to register with the fixed channels 46 when the line-holder is in its right-hand position. The line-holder H comprises upper and lower bars 88$^a$ and a series of vertical bars 88$^b$, in which the channels 88 are formed.

The line-holder H is moved to the left by a spring 89, shaft 90, gears 91, and racks 92, Figs. 5, 13, and 14. It is moved to the right step by step by means of a pinion 93 on shaft 90, rack 94, ratchet-teeth 95 on said rack, pawl 96, arm 97, pinion 98 on said arm, and rack 99, having a roll-engaging cam 101 on the shaft 35. When the line-holder H is in its left-hand position, its right-hand channel 88 registers with the receptacle or box 87. During the first revolution of the movement-shaft 35 a bar or bail 102 is drawn forward, transferring a line from box 87 to the first channel 88. The bar 102 is connected to a pair of rods 103, which rods are connected to arms 104 on the ends of a rock-shaft 105. Said rock-shaft is operated by an arm 106, which engages a cam 107 on shaft 35. During the succeeding movement of the rock-shaft the line-holder H is shifted by pawl 96 until the second line-channel 88 registers with the box 87 and a line is ejected from said box into said channel, while a new line is transferred from the galley to said box. The line-holder is held in its several positions in which the channels 88 register with the box 87 by means of a detent to be presently described.

The clutch member 34 of shaft 35 is similar to the clutch member 32, previously described. Pivoted in the shaft 35 is a spring-pawl 108, which constantly tends to engage the ratchet-teeth of the rotating clutch member 34. The pawl is held normally out of engagement by the beveled end of an arm 109 of a lever $c$, pivoted at 110, which lever is normally locked in position to hold the pawl disengaged by a pivoted detent 111, carried by an arm 112 of said lever $c$, the detent 111 normally resting on a fixed block 113.

The line-holder H is held in its right-hand position against the tension of the spring 89 by a spring-plunger 114, which engages a notch 115 in a bar of the frame A, Figs. 15 and 16. At the last part of the revolution of movement-shaft 33 an arm 116 on said shaft, Fig. 13, strikes a spring-pin 117, which pin is forced rearward, pushing the plunger 114 out of the notch 115, Fig. 16. A gravity-pawl 118, Fig. 15, falls behind a shoulder of said plunger 114 and prevents it from reëngaging notch 115. The pin 117 immediately falls back, and the line-holder H is thus released and permitted to move to the left under the influence of its spring 89. When it reaches its left-hand position, which is shown in Fig. 14, pawl 118 is thrown out of engagement with plunger 114 by a projection 119, and the plunger 114 is free to engage any one of the series of notches 115. These notches are beveled at their right edges, so that the line-holder may be pushed to the right step by step, the abrupt left wall of the notches 115 serving to prevent it from moving again to the left and to hold it with its channels successively in register with the box 87. Just as the line-holder reaches its right-hand position a pin or shoulder 100 on it engages an arm 100$^a$ on lever $c$ and causes arm 109 to disengage pawl 108 and stop shaft 35. In Fig. 13 the line-holder is shown in position to transfer its lines to the fixed distributing-channels 46. The type are held in the channels 88 and 46 by partition-plates 120, which are carried by a slide 121. When the type have all been withdrawn from the channels 46 and the movement-shaft 33 is started, as heretofore described, the slide 121 is moved to the right and the partition-plates withdrawn from between the channels 46 and 88. This is effected by means of an arm 122 of rock-shaft 123 engaging a pin 124 on slide 121. The shaft 123 is rocked by a cam 125 on shaft 33.

While the line-partitions 120 are withdrawn the lines of type are transferred from the channels 88 to the channels 46 by means of plungers 126, which are connected to arms 127 on rock-shafts 128, which shafts are simultaneously rocked by means of a series of arms 129 and a connecting-link 130, the link 130 being operated by a lever 131 and a cam 132 on shaft 33. In this manner the four lines in the line-holder are transferred simultaneously to the four fixed channels 46, and thereafter the partitions 120 are moved forward to retain the type in the fixed channels and the line-holder is immediately carried to the left to receive four new lines in the manner hereinbefore described.

By means of the devices heretofore described the lines of type are separated from the dead matter in the galley and placed four at a time in the distributer-channels 46, in which they are fed upward yieldingly by the weighted pushers or slides 47. It now remains to describe the manner in which the individual type are separated from the lines and conveyed to their respective magazines. In the machine illustrated there are seven magazines M, which is a convenient number to use, and the type and spaces are first divided into seven groups corresponding to the magazines, the type in each group being subsequently distributed into the proper channels of their magazines. Two of the magazines may be used for lower-case letters, and two or more channels may be used for each of the letters which occur oftenest, if desired.

Each line of type $t$ is constantly urged upward by the weighted pusher, and it is prevented from rising by a yoke-shaped piece 133, Figs. 1, 5, and 8, which bears on the upper end of the line, said yoke-shaped pieces being carried on levers pivoted to brackets 134. The vertical movements of the yokes 133 are controlled by a bail 135, which is carried by arms 136 on a rock-shaft 137. The shaft 137 is rocked to move the bail slowly up and down by means of an arm 138, link 139, cam-lever 140, and cam 141 on the shaft 23.

Each time the line is permitted to rise the uppermost type or space is pushed off and to the rear by a pusher 142, actuated by a spring-arm 143 on a rock-shaft 144, there being one pusher for each line of type, and the spring-arms 143 being connected to a common rock-shaft. The shaft 144 is rocked by means of an arm 145, link 146, cam-lever 147, and cam 148 on the shaft 23. The operation of the type-separating devices is as follows: Immediately after the yokes 133 begin to rise the pusher 142 is moved forward and engages the rear face of the uppermost type. The spring-arm 143 permits the pusher to stop, but urges it continuously against the type, and immediately when the lower face of the uppermost type reaches the upper end of the channel the pusher moves it rearward and from under the resisting-yoke 133, at the same time stopping the upward movement of the type-line. In this way the uppermost type is always removed, regardless of thickness, and the remaining type are kept in the channel. Thus four types are removed from the four lines each time the shaft 23 makes a rotation.

The type $t$ are provided with two sets of notches 149 150, as shown in Figs. 11 and 12, which notches are used to effect the separation of the type first into groups or fonts and secondly into individuals in their respective magazines. As the type are cut off from the lines they are picked up and moved step by step over a series of channels corresponding to the different magazines. The spaces are dropped into the first channel $s$, and the character-types are dropped into the succeeding channels $m$ $m'$, &c. The space-channel has two stationary sides or partition-plates 152, and its bottom is formed by a belt 153, passing around pulleys 154 155. The character-channels $m$ $m'$ are formed by stationary guides 156 and a broad belt 157, which passes around pulleys 158 and 159. The pulleys 154 and 158 are on a shaft 160, which is driven by bevel-gears 161, pulley 162, band 163, and pulley 164 on the shaft 23, Figs. 1 and 3.

The spaces are delivered by the belt 153 to a receptacle 165, which moves to the rear and then upward, delivering the spaces in front of a pusher 250, Figs. 1, 2, 4, and 7. The receiver 165 is mounted on a slide 166, which is carried on an elevator 167. The slide 166 is reciprocated by means of a link 168, cam-lever 169, and cam 170 on shaft 23. The elevator 167 is operated by link 171, arms 172, 173, link 174, and arm 175 on rock-shaft 176, Fig. 2. Shaft 176 is rocked by means of arm 177, link 178, cam-slide 179, and cam 180 on shaft 23. The transferring and elevating cams are timed so that the space is carried to the rear in its lowermost position and then moved by the elevator 167 to a position in front of the space-ejector 250. It is temporarily held in this position by means of a brush or other friction device 181, Fig. 4, until forwarded by the pusher 250, the elevator descending and the receiver 165 moving forward to receive another space. The space-pusher 250 is reciprocated by an arm 182 on a rock-shaft 183. This shaft is rocked by means of a cam-arm 184, coöperating with the cam-groove 185 on a cam-piece carried by the shaft 23, Figs. 1, 2, and 4. The space-ejector 250 moves the space along the distributer-table L to bring it opposite to the space-magazine S, in which the various sizes of spaces are distributed. A detent 165$^a$ retains spaces in channel 152 when the elevator is not in register therewith.

The character-types are moved by their conveying-belt through the channels $m$ $m'$ into corresponding receptacles in an elevator 186, Figs. 1, 2, 4, and 7. This elevator is periodically raised to carry the types contained therein to a series of channels $n$ $n'$, having their receiving ends above the corresponding channels $m$ $m'$, or nearly so. The elevator is carried by a slide 187, which is spring-tensioned to the rear and provided with a roll 188, which bears on a vertically-movable rod 189, connected by link 190 to an arm 191 on the rock-shaft 176.

The elevator 186 is provided with a depending leg 192, which has a toe 193, adapted to enter and engage with a recess 194 in the slide 189. As slide 189 rises a cam or incline 195 permits the slide 187 and the elevator to move to the rear slightly. If any type is partly on and partly off of the elevator, it will prevent the elevator from moving to the rear and the toe 193 from engaging the slide 189. The elevator will therefore not be raised at that stroke of the slide 189. Before the slide 189 again rises the type will be fully on the elevator and the toe will engage the slide and raise the elevator until it registers with the upper channels $n$ $n'$. The type will then be driven in said channels by a series of pushers 196, carried by a slide 197, reciprocated by an arm 198 on the rock-shaft 183. As shown in Fig. 7, the type are forced along the channels $n$ $n'$ end to end until they reach their respective magazines, each of the channels terminating at the forward end of a magazine. The lower-case magazine M$^5$ is made in two sections, to each of which type are delivered simultaneously. These type are supplied by two channels $n^5$ $n^6$. The type from the channel $n^6$ are delivered to a gangway O$^6$ and carried along said gangway step by step until they are opposite a pusher 199, which pusher is reciprocated to deliver the type to a point 200 at the middle of the magazine M$^5$. The pusher 199 is reciprocated by means of rack 201, shaft 202, and rack 203 on space-pusher 250, the shaft being provided with pinions engaging said racks.

By the mechanism described the type are separated into fonts and the type of each font or group are delivered one at a time each to its proper magazine. It remains to describe the devices for distributing the type into their respective magazine-channels. The devices for separating the type into groups or fonts are exactly the same as the devices for distributing them into channels, and the description following will answer for both.

The magazines are each separated by partitions 204 into a series of vertical channels 205, Fig. 7. The magazine-mouths are horizontal, and over each magazine is a pair of supporting blades or shelves 206 207, which are movable toward and from each other. When moved toward each other, the blades are in position to support the ends of the type, and when moved apart they permit the type to drop into the magazine unless sustained by other means. The shelves 206 for all of the magazines are connected by means of bars 208, and the shelves 207 are in like manner connected by bars 209. The shelves and bars form frames which are periodically reciprocated to move the shelves toward and from each other by means of cam-levers 210 211, operated by cams 212 213 on shaft 20, Figs. 3, 5, and 9.

The channel-partitions 204 are each provided with a rib 214, which coöperates with a notch 215, formed in each type to prevent the type from turning as they drop down the channel. The upper ends of the partitions are also provided with two projecting teeth or prongs 216, which are beveled at their upper ends and serve to guide the type accurately into a position over the channels, Figs. 8 and 9.

The type are carried step by step over the magazine-mouths and presented to the successive channel-mouths until they reach their proper channels, when they are dropped. They are picked up by devices which are to be presently described and carried over the projections 216 from one channel to the next and deposited momentarily upon the shelves. The pick-up devices are so related to the notches in the type that they will not lift a type which is over its appropriate channel, but will lift all types which are not so placed. While the types are being transported from one channel to the next, the shelves are withdrawn and the types which are over their proper channels are dropped. The shelves then move inward and the remaining types are again deposited upon them. The types are picked up and stepped along the mouths of the magazines by fingers carried by two sliding members upon a frame which is periodically raised and lowered to lift the type from one channel to another. Said frame also has fingers, and it is adapted to swing forward and backward to bring the fingers into action to coöperate with the fingers on the slides.

The frames X are provided with a pair of fingers $x$ for each magazine-channel, said fingers being comparatively stiff. These frames are suspended upon links 217, carried by arms 218 upon a pair of rock-shafts 219, Figs. 1, 5, and 9. The rear shaft 219 is rocked by a cam-lever 220 and cam 221 on shaft 23, Figs. 1 and 4. The shafts 219 are connected and caused to rock simultaneously by arms 222 and a connecting-link 223. The frames X are moved back and forth by a rock-shaft $X'$ and connecting-links $x'$, which links are connected to arms on the rock-shaft. A second set of fingers $y$ are carried by slides Y, which are mounted to reciprocate in the frames X, said slides Y being reciprocated by links $y'$, connected to arms on a rock-shaft $Y'$, Figs. 1, 5, 8, and 9. The flexible fingers $y$ are suitably connected to cross-pieces 224 of the slides Y, upon which they are arranged differently for each channel in a magazine to correspond to the nicks in the respective types of the magazine. A third set of fingers $z$ are suitably connected to a slide Z, also mounted to reciprocate on the frames X. The fingers $z$ are centrally located, and they are intended to come into action after the shelves have been withdrawn to pick up any types which have not been picked up by the combination fingers on members X and Y and which have not dropped into their channels because of being defective, the channels full, or for any other reason. The finger-slide Z is reciprocated by means of links $z'$, connected to arms on a rock-shaft $Z'$.

The shafts $X'$ $Y'$ $Z'$ are provided with upwardly-extending arms 225, 226, and 227. The arms 225 and 226 are connected by a pair of toggle-levers 228, and the arms 226 and 227 are connected by toggle-levers 229. The toggle-levers 228 are connected to a cam-rod 230, which has a roll 231 spring-pressed against a cam 232 on shaft 23. Said rod 230 is supported at its forward end by a pivoted link 233 and held in contact with the cam by a spring 234, Figs. 1 and 3.

When the toggle-levers 228 229 are in line, the rock-shafts are moved exactly alike, and the pick-up fingers all move in unison. To cause the fingers to grip the type, it is necessary to have them move toward and from each other. For this purpose the toggle-lever 228 is connected to a link 235 with a cam-lever 236, operated by a cam-slot in cam-wheel 240, Figs. 1 and 3. Likewise, the toggle-lever 229 is connected by a link 238 to a cam-lever 239, operated by a cam-slot in the opposite face of the cam-wheel 240, Figs. 1, 2, and 3. As shown in Figs. 8 and 10, two sets of pick-up fingers $x$ and $y$ extend across the channels over the belts 153 and 157 and opposite the line-channels 46. These fingers carry the type as they are cut off from the line across the belts, dropping all of the spaces on the space-carrying belt and the character-types into their proper channels on the belt 157. This primary separation is effected by means of the fingers $x$ and $y$ and nicks 149 on one side of each type and spaces, while the secondary separation is effected by means of the fingers $x$ and $y$ and nicks 150 on the other side of the spaces and type. It will thus be seen that the pick-up fingers for the primary and secondary separations and for all of the magazines are operated in unison from a common set of cams upon the constantly-running shafts 20 and 23.

The frame Y, which carries the fingers $y$ over the magazines, is connected by suitable connections 280, Fig. 9, to the frame $x^2$, which carries the fingers $x$ over the belts, and the frame Y², carrying the fingers y over the belts, is operated from the frame X. Hence the fingers x y, located over the belts, have a movement the reverse of that of the fingers x y, located over the magazines, and operate on the nicks on the opposite side of the type.

The operation of the machine will be understood from the foregoing detailed description of the mechanism, and a brief outline of the same in conclusion will suffice. The column of type to be distributed is placed in the galley G over the lifting-bar 39. The line-holder H starts with its right-hand channel opposite the type-receptacle 87. As shown, this receptacle is capable of holding five lines of type, but this is only for convenience of construction, and, if desired, the single lines might be moved out of the galley and directly into the channels in the line-holder by the pushers 74 and 102. The line-holder-loading mechanism is controlled by the movement-shaft 35, which makes one complete rotation for each channel in the line-holder and then stops until the line-holder is empty and ready to be filled again. At each of the four consecutive revolutions of the shaft 35 a line is moved from the galley into the receptacle 87, another line is moved from the receptacle 87 into a channel on the line-holder, and the line-holder is advanced to bring its next empty channel into position to receive a new line. If there are any leads in the column, they are separated from the type and discharged. When the line-holder is filled, it is moved to the right to bring its channels opposite the line-feed channels 46. When these latter channels are empty, the movement-shaft 33 is automatically started and makes one revolution. During this revolution the partition-plates between the channels 46 and 88 are withdrawn and the lines of type are transferred from channels 88 to 46. Just previous to this operation the weighted pushers in the channels 46 are lowered, and after the lines are received upon them they are released, and thereafter they continue to raise the lines until all of the type in them are cut off and fed to the distributer. The types are cut off from the lines in channels 46 by the devices shown in Fig. 8 and deposited on ledge 251, Fig. 8. They are then picked up by the first set of pick-up fingers x y and laid on the shelves 206 207 over the space-channel s. The second set of pick-up fingers pick up all of the types from their positions over the channel s and lay them on a ledge 252. As the type are picked up the shelves are withdrawn and the spaces, which are not removed from channel s, drop onto the belt 153. The third set of fingers take the type from the ledge 252 and deposit them over the channel m. All of the type are then picked up from the channel m and deposited over the channel m', excepting those destined for the magazine M, and these latter drop upon the belt 157 the next time the type-shelves are separated. This operation is repeated until all of the type have been deposited in the channels m m', &c., which completes the primary separation into groups or fonts. The spaces delivered from the space-belt to the elevator 165 are carried rearward one by one and delivered by the pusher 250 to the forward end of the mouth of the space-magazine S. Likewise the type are raised by the elevator 186 and delivered to the forward ends of their magazine-mouths. The combination pick-up fingers operate continuously to take the type as they are delivered and carry them step by step along the magazine-mouths until they are dropped into their proper channels.

It will be evident that various changes in the construction and arrangement of the machine hereinbefore described may be made without departing from the spirit and scope of the invention, and hence I do not care to limit myself to the precise embodiment of the invention illustrated and described.

What I claim, and desire to secure by Letters Patent, is—

1. In a type-distributing machine, the combination of automatic means for separating lines of type from a column thereof, automatic mechanism for distributing a line of type into groups or fonts, and automatic mechanism for distributing each group or font into its appropriate magazine.

2. In a type-distributing machine, the combination of automatic mechanism for separating lines of type from a column thereof, means for distributing a plurality of lines of type simultaneously into groups or fonts, and means for distributing said groups or fonts into their respective magazines.

3. In a type-distributing machine, the combination of means for simultaneously distributing a series of lines of type into groups or fonts, means for distributing the type of the several fonts to their appropriate magazine-channels, and means for conveying the type from the first distributer to the second.

4. In a type-distributing machine, the combination of means for distributing a line of type into groups or fonts, means for distributing the individual type of the several groups or fonts to their appropriate magazine-channels, and a series of channels through which the type are conveyed from the first distributer to the second, said channels being each adapted to hold a plurality of type, whereby they may be supplied to the second distributer at regular intervals.

5. In a type-distributing machine, the combination with a galley, of a movable support for the type therein, and means for feeding the column forward while sustained by said support.

6. In a type-distributing machine, the combination with a galley having a fixed support for the column of type therein, of a movable support adapted to temporarily sustain the column of type, and means for moving said column forward while sustained on said latter support.

7. In a type-distributing machine, the combination with the galley, of the pivotally-supported bar beneath the galley, means for raising said bar into position to support the type in the galley, and means for moving the column of type forward while so supported.

8. In a type-distributing machine, the combination of a galley, means for distributing a plurality of lines of type simultaneously, and a movable type-line holder adapted to receive a plurality of lines of type and to convey said type from the galley to the distributing means.

9. In a type-distributing machine, the combination of a galley, a plurality of channels from which type are distributed simultaneously, and means for transferring a corresponding plurality of lines of type simultaneously from said galley to said channels.

10. In a type-distributing machine, the combination of a galley, a plurality of fixed distributing-channels, a type-line holder having a corresponding plurality of channels, means for transferring lines of type to the channels in said holder, and means for transferring said lines from said holder to said distributing-channels.

11. In a type-distributing machine, the combination with a galley, of type-line holder having a plurality of channels, means for moving said holder step by step to bring successive channels into position to receive lines of type, and means for transferring lines of type successively from said galley to said holder.

12. In a type-distributing machine, the combination of a plurality of distributing-channels, a type-line holder having a corresponding plurality of channels, a plurality of partition-plates separating the former channels from the latter, means for withdrawing said partition-plates temporarily, and means for transferring lines of type from the latter channels to the former.

13. In a type-distributing machine, a series of distributing-channels, means for feeding lines of type yieldingly through said channels, means for separating the type into individuals, and a plurality of distributing devices arranged to distribute the types simultaneously from all of said lines.

14. In a type-distributing machine, the combination of a series of type-channels, means for feeding lines of type therein, means for cutting off single type for each line, means for distributing the type to magazines, and means for moving said type as they are cut off from the line to the distributers.

15. In a type-distributing machine, the combination of a series of distributing-channels, a series of distributing devices arranged to distribute the type from all of said channels simultaneously, a galley, and means for reloading said channels simultaneously.

16. In a type-distributing machine, the combination of a plurality of distributing-channels, a plurality of line-pushers therein, a plurality of weights connected to said pushers, a winding-drum to which said weights are connected, a normally idle movement-shaft geared to said drum, and means for starting said shaft when the type in said channels are exhausted.

17. In a type-distributing machine, a series of channels comprising fixed side walls and a common belt forming the bottom thereof.

18. In a type-distributing machine, a series of distributing-channels comprising fixed side walls, and a traveling belt beneath said walls, in combination with distributing devices arranged to drop the several type into their appropriate channels.

19. In a type-distributing machine, the combination of a series of magazines, a series of channels leading to said magazines respectively, and means for distributing type by fonts or groups and forwarding said type to their respective magazines.

20. In a type-distributing machine, the combination of a series of magazines, a series of channels leading to said magazines respectively, a primary distributing mechanism arranged to distribute the type by fonts or groups to said channels, and a secondary distributing mechanism arranged to distribute the types into their magazines.

21. In a type-distributing machine, the combination of a primary distributing mechanism arranged to separate type into groups or fonts, and a secondary distributing mechanism arranged to distribute the type individually into their magazines, said distributing mechanisms being operated simultaneously from a common source of movement.

22. In a type-distributing machine, the combination of a series of magazines, a corresponding series of channels into which type are distributed by groups or fonts, a second series of channels leading to said magazines, and elevators arranged to transfer the type from the former channels to the latter.

23. In a type-distributing machine, the combination of a series of channels into which the type are distributed by groups or fonts, a second series of channels above the first-named channels, a series of magazines in the rear of said channels, means for moving the type in one direction in the lower channels and in the opposite direction in the upper channels, and means for transferring the type from the lower channels to the upper channels.

24. In a type-distributing machine, two series of channels one above the other, in combination with an elevator adapted to receive a plurality of type from one series of said channels, and a pusher adapted to discharge said type from the elevator into the second series of channels.

25. In a type-distributing machine, the combination with a magazine, of a movable blade or shelf arranged to temporarily support type at the magazine-mouth.

26. In a type-distributing machine, the combination with a magazine, of a pair of movable blades or shelves arranged on opposite sides of the magazine-mouth, and means for reciprocating said blades toward and from each other.

27. In a type-distributing machine, the combination with a magazine, and means for temporarily supporting type over the magazine-mouth, of two sets of pick-up fingers adapted to convey type step by step over said magazine-mouth, and means for moving said pick-up fingers bodily to convey type from one channel to the next and relatively to grip the type.

28. In a type-distributing machine, the combination with a type-magazine, of two members arranged above the magazine-mouth, pick-up fingers carried by said members, and means for moving said members vertically and horizontally and relatively, for the purpose set forth.

29. In a type-distributing machine, the combination with a magazine, a pair of members suspended above said magazine, means for giving said members a horizontal reciprocating movement, means for giving said members a vertical movement, and means for giving said members a slight relative movement, said members being provided with pick-up fingers arranged in different combinations, for the purpose set forth.

30. In a type-distributing machine, the combination with a magazine, of a member above said magazine provided with pick-up fingers, vertically-movable parts upon which said member is supported, means for raising and lowering said members, a sliding member mounted upon said first-named member and provided with additional pick-up fingers, and means for reciprocating both of said members relatively to the magazine and to each other.

31. In a type-distributing machine, the combination of a magazine, three members arranged longitudinally of said magazine and above the same, pick-up fingers carried by each of said members, means for bringing into action two sets of pick-up fingers whereby the type are distributed, and means for subsequently bringing into action the third set of pick-up fingers whereby defective or surplus type not carried over by the first-named fingers may be removed.

32. In a type-distributing machine, the combination with a magazine, of three relatively movable members arranged above the mouth of the magazine, and pick-up fingers carried by each of said members, for the purpose set forth.

33. In a type-distributing machine, the combination of a plurality of magazines, with a plurality of pairs of blades or shelves, and means for simultaneously reciprocating said blades or shelves, substantially as and for the purpose set forth.

34. In a type-distributing machine, the combination of a plurality of magazines, blades arranged on opposite sides of the mouths of said magazines, means for moving said blades toward and from each other, connections between all of the blades having like movement, and means for simultaneously moving all of said blades, for the purpose set forth.

35. In a type-distributing machine, the combination of a plurality of magazines, a pair of reciprocating and vertically-movable members above each of said magazines, pick-up fingers carried by said members, and common means for imparting a vertical movement to all of said members simultaneously.

In testimony whereof I affix my signature in presence of two witnesses.

FRANK AMOS JOHNSON.

Witnesses:
EDMUND ANTHONY, Jr.,
BENJAMIN ANTHONY.